Patented Dec. 16, 1952

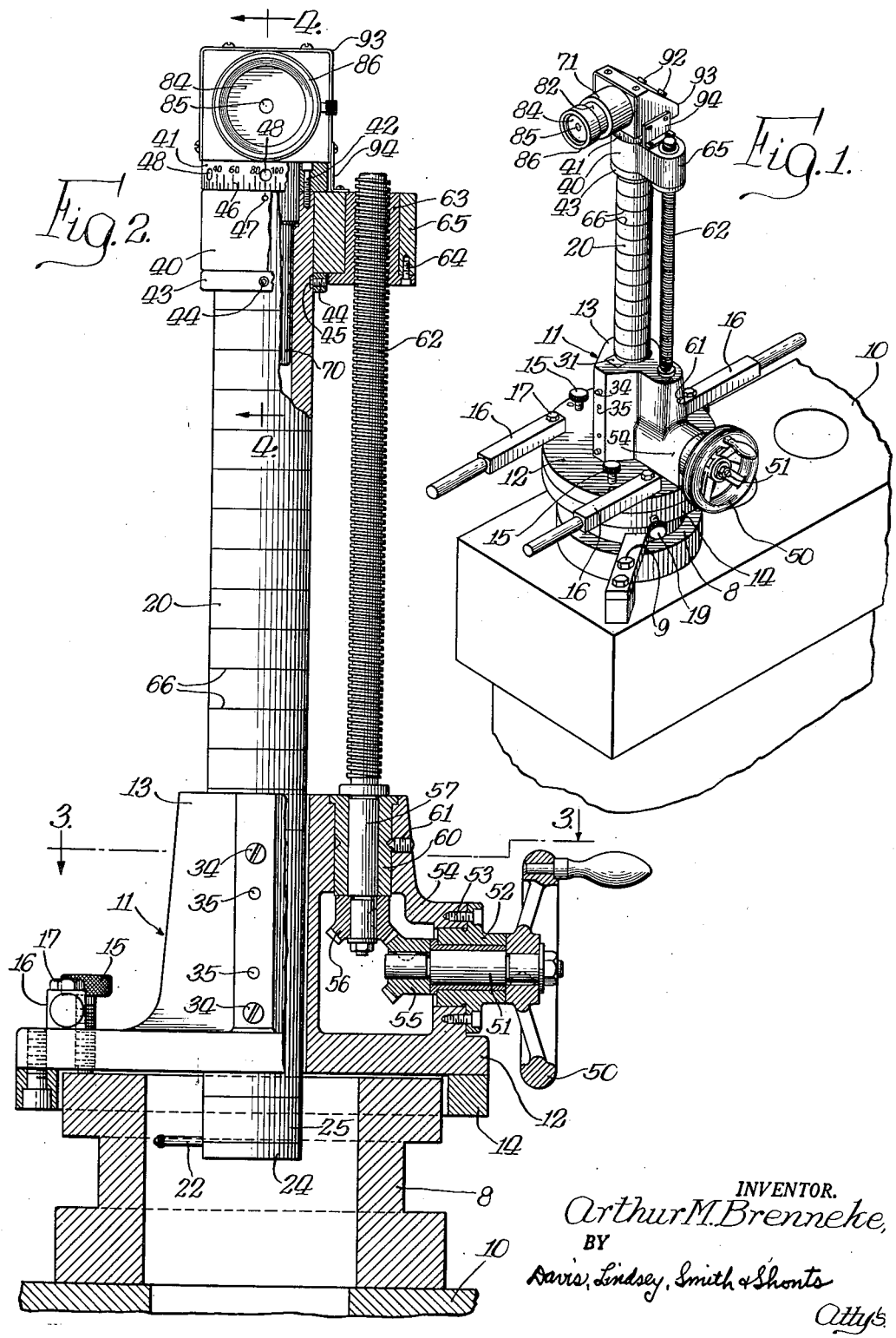

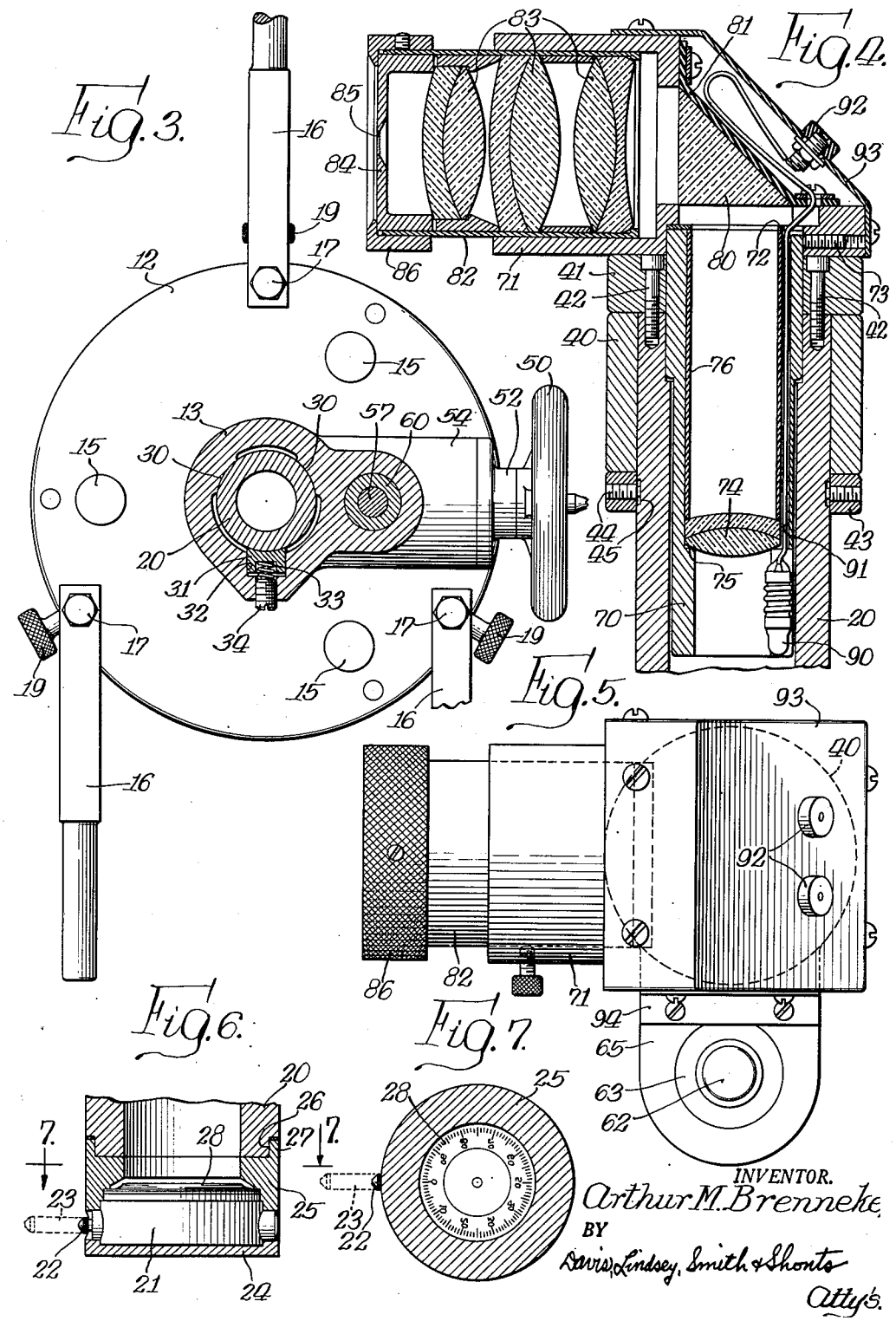

2,621,416

UNITED STATES PATENT OFFICE 2,621,416

CYLINDER BORE CONTOUR GAUGE

Arthur M. Brenneke, New Castle, Ind., assignor to Perfect Circle Corporation, Hagerstown, Ind., a corporation of Indiana Application April 16, 1947, Serial No. 741,806

8 Claims. (Cl. 33—178)

The invention relates generally to gauges and more particularly to an optical gauge for determining the character of a cylinder bore.

In internal combustion engines, the cylinder walls are subjected to wear and distortion due to the reciprocation of the pistons therein and the forces acting on the pistons. Serious distortion of cylinders may also result from stresses incidental to attachment of cylinder heads, manifolds, and other parts. Such wear and distortion may vary in extent in different portions of the cylinder both angularly about the axis of the cylinder and longitudinally thereof. In servicing an engine, it is important to know in just what parts of the cylinder wall wear or distortion has occurred and the extent of the wear or distortion in such parts.

The general object of the present invention is to provide a novel gauge by which the contour of the entire surface of a cylinder bore may readily be determined.

Another object is to provide a novel gauge of the foregoing character, having a feeler member shiftable by contact with the cylinder wall, and indicating means observable from a point externally of the cylinder and responsive to the shifting of said feeler member.

A further object is to provide a novel gauge of the foregoing character, having an indicator with a feeler member engageable with the cylinder wall, and an indicator support positioned coaxially with the cylinder and shiftable both rotatably and axially to move the feeler member over the entire surface of the cylinder wall.

Still another object is to provide a novel gauge of the foregoing character, having an indicator with a feeler member engageable with the cylinder wall, a hollow support for said indicator extending beyond one end of the cylinder, and optical means at the other end of said support for observing the indicator through said support.

Other objects and advantages will become apparent from the following description taken in connection with the accompanying drawings, in which:

Figure 1 is a perspective view of a cylinder block showing a gauge embodying the features of the invention mounted therein.

Fig. 2 is a front elevational view, partially in section, of the gauge.

Fig. 3 is a transverse section taken on the line 3—3 of Fig. 2.

Fig. 4 is a fragmentary vertical section taken on the line 4—4 of Fig. 2.

Fig. 5 is a plan view of the upper end of the gauge.

Fig. 6 is a fragmentary, vertical sectional view of the lower end of the gauge.

Fig. 7 is a transverse sectional view taken on the line 7—7 of Fig. 6.

As heretofore mentioned, a gauge embodying the features of the invention is adapted for use in determining the exact shape or contour of a generally cylindrical bore. While the device may be used in connection with any bore within the range of sizes for which it is adapted, it is particularly adapted for use in determining the contours of the cylinder bores in the cylinder block of an internal combustion engine. In overhauling an internal combustion engine, it is, of course, of importance to know the extent of wear that has taken place in the cylinder walls. This information is also of interest to the designer of any particular engine so that he may know the tendency toward wear in a particular design.

The present device is provided so that the entire bore's surface may be explored and the amount of wear at any point on such surface readily determined. To this end, the device comprises generally an indicator, preferably of the dial type, having its dial positioned coaxially with the cylinder and the contact member thereof extending radially to engage the cylinder walls. The indicator is held in such a manner that it may be moved both axially of the cylinder bore as well as rotatably so that the feeler may be moved into contact with the entire cylindrical surface of the bore.

The indicator is carried on the end of a supporting member, which is preferably tubular, and this member is carried by a base structure which permits both axial and rotative movement of the tubular member, thus moving the feeler over the entire surface of the bore. The tubular member extends beyond the end of the bore and at its outer end is provided with a device by which the dial of the indicator may be observed through the tubular member. Preferably, such device comprises an optical system including lenses for readily observing the dial of the gauge. The device may also include a lamp for illuminating the dial.

In the preferred embodiment disclosed in the drawing, the gauge is shown, in Fig. 1, as mounted on an engine cylinder block, indicated at 10. The gauge is adapted to be positioned over one of the cylinder bores in the block 10 and to this end an adapter may be provided. While adapters of various forms may be utilized, for purposes of illustration I have shown an adapter 8 of generally spool shaped form adapted to be seated on the top face of the block 10 and to be clamped thereto as by clamps 9. The gauge includes a base structure, indicated generally at 11, comprising a cap portion 12 and an upstanding hub 13. The cap portion 12 is provided with a downwardly extending flange 14 (see Fig. 2) and is thus adapted to seat on the top face of the adapter 8, and screws 15 may be provided in the cap portion for positioning the axis of the base structure in alignment with the axis of the cylinder, the screws 15 being adapted to bear against the adapter 8 and be adjusted, as will be apparent, to effect vertical alignment. Centering of the gauge with the cylinder may be accomplished by radial screws 19 threaded into the flange 14 to engage the adapter. A plurality of handles 16, detachably secured to the cap portion 12 as by screws 17, may be provided for carrying the device from one block to another.

Mounted within the hub portion 13 of the base structure coaxially with the cylinder bore is a supporting member 20 extending downwardly through the hub portion 13 and into the cylinder. The supporting member 20 is preferably tubular in form and carries at its lower end an indicator 21 (see Fig. 6) having a radially projecting feeler 22 (see Figs. 2, 6 and 7). The feeler 22 is adapted to engage the wall surface of the cylindrical bore and to be moved both rotatably within and axially of the cylinder so that it may contact the entire wall surface. The feeler 22 may be of relatively short extent, as shown in full lines in Figs. 6 and 7, for the smaller diameters of cylinders, or may be provided with an extension 23, shown in dotted lines in these two figures and in full lines in Fig. 2, for cylinders of larger diameters. The indicator 21 is secured between a cap 24 and a ring 25 as by screws (not shown) connecting the cap and ring, and the ring 25 is in turn secured to the lower end of the tubular member 20 as by another set of screws (not shown). Preferably, the lower end of the tubular member 20 has a reduced portion 26 fitting within a flange 27 on the ring 25 so that the two will be held accurately centered, thus centering the indicator 21 with the tubular member 20. The indicator 21 is provided with a dial 28 for indicating movement of the feeler 22 and facing upwardly so that it may be viewed through the tubular member 20.

To provide for both the rotative and axial movement of the tubular member 20, to move the feeler 22 over the cylindrical surface, the hub 13 is preferably provided with a pair of angularly spaced segmental surfaces 30 (see Fig. 3) providing a bearing surface for the tubular member 20. To hold the tubular member 20 in contact with the segmental bearing surfaces 30, a bearing block 31 is mounted in a groove 32 cut through the hub 13 and is pressed against the tubular member 20 by springs 33 held in place by set screws 34 (see Figs. 2 and 3) threaded in the hub 13. The bearing block 31 may be held against any vertical shifting movement by dowel pins 35 extending inwardly in the hub 13 and into the bearing block 31.

The tubular member 20 is supported at its outer end by a collar 40 embracing the outer end of the tubular member. The tubular member 20 is held against endwise movement relative to the collar 40 but may be freely rotated therein. To this end, a ring 41 is rigidly secured to the upper end of the tubular member 20 as by screws 42, the ring being of sufficient diameter to seat on the outer face of the collar 40. Abutting the under face of the collar 40 and embracing the tubular member 20, is a second ring 43, provided with set screws 44 engaging in an annular groove 45 formed in the tubular member 20. The ring 43 is thus rigidly secured to the tubular member 20. From the foregoing, it will be apparent that the tubular member 20 is held against endwise movement relative to the collar 40 by the rings 41 and 43, but may be rotated within the collar 40. Rotation of the tubular member 20 is preferably effected by inserting a short rod (not shown) into any one of a plurality of radial holes 48 (see Fig. 2) provided in the ring 41 and turning the ring by hand, thus moving the feeler 22 of the indicator about the inner periphery of the cylindrical bore. The ring 41 may be provided with indicia 46 cooperating with a fixed index mark 47 on the collar 40 to indicate the amount of angular or rotative movement of the tubular member 20.

For moving the tubular member 20 axially, manually operable means is carried on the base structure 11 for this purpose. Such means, in the present instance, comprises a hand wheel 50 (see Figs. 2 and 3) rigidly secured to a stub shaft 51, the stub shaft 51 being journalled in a bearing 52 rigidly secured, as by screws 53, to a housing portion 54 formed on one side of the hub 13 of the base structure. On the inner end of the stub shaft 51 is rigidly secured a bevel gear 55 meshing with another bevel gear 56 on the lower end of a screw shaft 57. The screw shaft 57 is journaled in a bearing 60 rigidly secured in the housing 54 as by a set screw 61. The screw shaft 57 extends beyond the hub 13 in parallel relation to the tubular member 20 and, in its extended portion, is threaded as at 62 to mesh with a nut 63, rigidly secured, as by screws 64, to a sidewardly extending portion 65 of the collar 40. Thus, rotation of the hand wheel 50 will cause rotation of the screw 62 to move the collar and consequently the tubular member 20 axially. Movement of the feeler 22 of the indicator both axially and peripherally within the cylinder bore may thereby be effected.

In checking the contour of a cylinder bore, the feeler 22 is preferably rotated at predetermined intervals throughout the length of the bore. To assist in determining such intervals, the tubular member 20 may be provided with a series of annular marks 66 (see Figs. 1 and 2) adapted to cooperate with some fixed surface on the device, such as the top face of the hub 13, the marks 66 being equally spaced from each other. Such marks 66 may, however, be disregarded and the intervals may be determined by turning the hand wheel 50 a predetermined number of revolutions for each interval, the number of revolutions, of course, depending upon what size interval is desired.

At the upper end of the tubular member is mounted a device for viewing the indicator dial 28 through the tubular member. Preferably, such device is optical in character and comprises a tubular portion 70 (see Figs. 2 and 4) located within the tubular member 20 and another portion 71 extending at right angles thereto. The last-mentioned portion 71 is preferably provided with an annular seat 72 to receive the upper end of the tubular portion 70, as is shown in Fig. 4, and is secured thereto as by set screws 73. Mounted within the tubular portion 70 is an objective lens 74 held against a shoulder 75, formed in the tubular portion, by a sleeve 76 mounted therein. Secured to the other portion 71 at its juncture with the portion 70 is a prism 80 held in place by an angularly positioned plate 81 so that the image transmitted by the objective lens 74 is reflected laterally into the portion 71. Within the portion 71 is slidably mounted a sleeve 82 carrying a series of eyepiece lenses 83, the sliding of the sleeve 82 permitting adjustment of these lenses into focus with the image transmitted by the objective lens 74 through the prism 80. At the outer end of the sleeve 82 is mounted a plug 84 provided with a centrally located sight opening 85 and held in place by a retaining collar 86. Thus, by placing one's eye adjacent the sight opening 85, the image of the dial 28 as transmitted by the objective lens 74, prism 80 and eyepiece lenses 83, may be viewed. Since the indicator dial 28 is within the tubular member 20 and thus shielded from any outside light, illumination thereof may be provided by a small lamp bulb 90 carried by the tubular portion 70 below the objective lens 74. The wiring for the lamp 90 may extend upwardly through a groove 91 formed in the tubular portion 70 and covered by the sleeve 76, the upper end of the wiring extending to the outside of the prism retaining plate 81 to connectors 92 mounted on an angularly positioned cover plate 93. The eyepiece device is preferably held against rotation, when the tubular member 20 is turned, and to this end an L-shaped bracket 94 (see Figs. 1, 2 and 5) is secured to the portion 71 of the eyepiece device and to the sidewardly extending portion 65 of the collar 40 as by screws. While the bracket 94 thus holds the eyepiece device against turning, the weight thereof is carried principally on the ring 41.

In use the adapter 8 is centered by eye with the bore of the cylinder and clamped to the block 10. The cap portion 12 of the base structure 11 is then placed on the adapter 8 over the cylinder bore and is centered with the bore by means of the screws 19. The screws 15 are also adjusted to align the axis of the tubular member 20 with the cylinder bore axis, the accuracy of the adjustment of both sets of screws being checked with the gauge alternately at the top and at the bottom of the bore so that such readjustment as is found necessary may be made. The feeler 22 is adjusted to the proper length for the diameter of the bore to be checked, by utilizing an extension 23 when necessary. The tubular member 20 is then lowered sufficiently to bring the feeler 22 within the bore of the cylinder, by turning the handwheel 50 to rotate the screw 62 and thus move the collar 40 downwardly. Assuming that it is desired to start the checking of the cylinder bore at the top thereof, the feeler 22 is moved only slightly within the cylinder bore and the transverse or annular mark 66 on the tubular member 20 adjacent the upper face of the hub 13 is noted. The tubular member 20 may then be rotated by grasping the ring 41, while the fluctuations registered on the dial 28 of the indicator are noted through the opening 85 of the eyepiece device. The entire inner periphery of the cylinder bore at this level may thereby be checked. Further checking of the bore may be similarly accomplished by again turning the hand-wheel 50 to lower the tubular member 20 and the feeler 22 a predetermined distance, such distance being readily determined by the annular marks 66. At each level at which the feeler 22 is positioned, the tubular member 20 may be rotated to explore the inner periphery of the cylinder bore.

By continuing the foregoing procedure for the full length of the cylinder bore, the entire surface contour of the bore may thereby be determined and the observations noted. Thus, the observer may obtain a complete knowledge of the dimensions of the bore and can determine the areas on the cylinder wall where wear or distortion has occurred.

I claim:

1. A gauge for determining the contour of a bore in a cylinder block, comprising a base adapted to be mounted on the block over said bore, a tubular member rotatably and slidably carried by said base and adapted to extend into said bore, means coacting with said base for aligning and centering said tubular member coaxially with said bore, a collar rotatably supporting the outer end of said member, a nut rigidly mounted in said collar on an axis parallel to said member, a screw mounted in said base and threaded into said nut for adjusting said member axially, manually operable means carried by said base for rotating said screw, a radius-measuring indicator carried by the inner end of said member, and a device extending into the outer end of said member for viewing said indicator through said member.

2. A gauge for determining the contour of a bore in a cylinder block, comprising a base adapted to be mounted on the block over said bore, a tubular member rotatably and slidably carried by said base and adapted to extend into said bore, means coacting with said base for aligning and centering said tubular member coaxially with said bore, a collar rotatably supporting the outer end of said member, a pair of rings each rigidly secured to said member on opposite sides of said collar to hold the member against endwise movement relative to said collar, manually operable means for shifting said collar to move said member axially, a radius-measuring indicator carried by the inner end of said member, and a device secured to said collar and extending into said tubular member for viewing said indicator through said tubular member.

3. A gauge for determining the contour of a bore in a cylinder block, comprising a base adapted to be mounted on the block over said bore, a tubular member rotatably and slidably carried by said base and adapted to extend into said bore, means coacting with said base for aligning and centering said tubular member coaxially with said bore, a collar rotatably supporting the outer end of said member, manually operable means for shifting said collar to move said member axially, a ring bearing against said collar and secured to the outer end of said member for rotating said member in said collar, a radius-measuring indicator carried by the inner end of said member, and a device supported on said ring and extending into the outer end of said member for viewing said indicator through said tubular member.

4. A gauge for determining the contour of a bore in a cylinder block, comprising a base adapted to be mounted on the block over said bore, a tubular member rotatably and slidably carried by said base and adapted to extend into said bore, means coacting with said base for aligning and centering said tubular member coaxially with said bore, and a radius-measuring indicator carried by the inner end of said member and having a radially extending cylinder contacting feeler, means carried by said base rotatably supporting the outer end of said member and for adjusting said member axially to move the feeler endwise of the cylinder, a ring secured to the outer end of said member for rotating the member thereby moving said feeler angularly within the cylinder, said ring having indicia for indicating the extent of angular movement of the feeler, and a device mounted at the outer end of said member for viewing said indicator through said member.

5. A gauge for determining the contour of a bore in a cylinder block, comprising a base adapted to be mounted on the block over said bore, a tubular member rotatably and slidably carried by said base and adapted to extend into said bore, means coacting with said base for aligning and centering said tubular member coaxially with said said bore, and a radius-measuring indicator carried by the inner end of said member, means carried by the base and rotatably supporting the outer end of said member, said means including a collar embracing said member, a ring rigidly secured to the outer end of said member and seated on said collar, and a device seated on said ring and rigidly secured to said collar for viewing said indicator through said member, said device being thereby held against rotation during rotary movement of said tubular member.

6. A gauge for determining the contour of a generally cylindrical bore, comprising a radius-measuring indicator adapted to be located within the bore and including a movable feeler adapted to bear radially against the cylinder wall and a dial for indicating radial movement of said feeler with the dial facing toward one end of the bore, a tubular member supporting said indicator and concentric with said dial, said member being movable both axially of the bore and rotatably on the axis of the bore and extending outwardly beyond said end of the bore, a base supporting said member for such axial and rotary movement, means coacting with said base for aligning and centering said tubular member coaxially with said bore, and a device mounted at the outer end of said member for viewing said dial through said member.

7. A gauge for determining the contour of a generally cylindrical bore in a block, comprising a base having a cap portion and an upstanding hub portion, said cap portion being adapted to overlie the end of the cylindrical bore and being provided with a depending peripheral flange, a tubular member carried by said hub portion and adapted to extend into said bore, a plurality of screws extending downwardly through said cap portion for longitudinally aligning the axis of said tubular member with the axis of the bore, a plurality of radial screws extending inwardly through said flange for centering said tubular member coaxially with said bore, a radius-measuring indicator carried by the inner end of said member and having a feeler adapted to contact the cylinder wall, said member being shiftable in said hub portion about and along the axis of the bore to move said feeler over the cylinder wall, and a device mounted at the outer end of said member for viewing said indicator.

8. A gauge for determining the contour of a bore in a cylinder block, comprising a base adapted to be mounted on and secured to the cylinder block, a tubular member rotatably and slidably carried by said base and adapted to extend into said bore, means coacting with said base for aligning and centering said tubular member coaxially with said bore, a radius-measuring indicator carried by the inner end of said member, means carried by the base and rotatably supporting the outer end of said member, and a laterally extending device at the outer end of said member for viewing said indicator through said member, said device being supported for relative rotation between it and said member and being secured to said last-mentioned means whereby said device is held at one position when said member is rotated.

ARTHUR M. BRENNEKE.

REFERENCES CITED

The following references are of record in the file of this patent:

UNITED STATES PATENTS

| Number | Name | Date |
|---|---|---|
| 791,282 | Nichols | May 30, 1905 |
| 1,206,502 | Bennett | Nov. 28, 1916 |
| 1,332,571 | Ray | Mar. 2, 1920 |
| 1,664,535 | Bartholdy | Apr. 3, 1928 |
| 1,870,857 | Mathewson | Aug. 9, 1932 |
| 2,123,355 | Feehrer et al. | July 12, 1938 |
| 2,307,831 | Emery | Jan. 12, 1943 |
| 2,307,950 | Plaut et al. | Jan. 12, 1943 |
| 2,354,870 | Messinger et al. | Aug. 1, 1944 |
| 2,357,569 | Wright et al. | Sept. 5, 1944 |
| 2,363,587 | Hardware | Nov. 28, 1944 |

FOREIGN PATENTS

| Number | Country | Date |
|---|---|---|
| 6,166 | Great Britain | Mar. 23, 1905 |
| 68,847 | Switzerland | July 11, 1914 |
| 520,721 | France | Feb. 19, 1921 |
| 463,361 | Great Britain | Mar. 30, 1937 |
| 644,333 | Germany | Apr. 29, 1937 |